US007157038B2

(12) United States Patent
Baird et al.

(10) Patent No.: US 7,157,038 B2
(45) Date of Patent: Jan. 2, 2007

(54) ULTRAVIOLET LASER ABLATIVE PATTERNING OF MICROSTRUCTURES IN SEMICONDUCTORS

(75) Inventors: Brian W. Baird, Oregon City, OR (US); Michael J. Wolfe, Portland, OR (US); Richard S. Harris, Portland, OR (US); Kevin P. Fahey, Portland, OR (US); Lian-Cheng Zou, Portland, OR (US); Thomas R. McNeil, Beaverton, OR (US)

(73) Assignee: Electro Scientific Industries, Inc., Portland, OR (US)

( * ) Notice: Subject to any disclaimer, the term of this patent is extended or adjusted under 35 U.S.C. 154(b) by 606 days.

(21) Appl. No.: 10/017,497

(22) Filed: Dec. 14, 2001

(65) Prior Publication Data

US 2002/0149136 A1 Oct. 17, 2002

Related U.S. Application Data

(62) Division of application No. 09/957,633, filed on Sep. 19, 2001, now abandoned, and a division of application No. 09/803,382, filed on Mar. 9, 2001, now abandoned.

(60) Provisional application No. 60/297,218, filed on Jun. 8, 2001, provisional application No. 60/265,556, filed on Jan. 31, 2001, provisional application No. 60/233,914, filed on Sep. 20, 2000, provisional application No. 60/233,913, filed on Sep. 20, 2000.

(51) Int. Cl.
*B23K 26/38* (2006.01)

(52) U.S. Cl. ............ 264/400; 219/121.69; 219/121.71; 219/121.76; 219/121.82; 219/121.83; 219/121.85

(58) Field of Classification Search ........................ 219/121.6–121.85; 264/400
See application file for complete search history.

(56) References Cited

U.S. PATENT DOCUMENTS 4,169,976 A 10/1979 Cirri .................... 219/121 LM (Continued)

FOREIGN PATENT DOCUMENTS

JP 4065154 3/1992

(Continued)

OTHER PUBLICATIONS

Anthony, T.R., "Diodes Formed by Laser Drilling and Diffusion," J. Appl. Phys., vol. 53 (Dec. 1982), pp. 9154-9164.

(Continued)

*Primary Examiner*—Stefan Staicovici
(74) *Attorney, Agent, or Firm*—Stoel Rives LLP

(57) ABSTRACT

Patterns with feature sizes of less than 50 microns are rapidly formed directly in semiconductors, particularly silicon, GaAs, indium phosphide, or single crystalline sapphire, using ultraviolet laser ablation. These patterns include very high aspect ratio cylindrical through-hole openings for integrated circuit connections; singulation of processed die contained on semiconductor wafers; and microtab cutting to separate microcircuit workpieces from a parent semiconductor wafer. Laser output pulses (32) from a diode-pumped, Q-switched frequency-tripled Nd:YAG, Nd:YVO$_4$, or Nd:YLF is directed to the workpiece (12) with high speed precision using a compound beam positioner. The optical system produces a Gaussian spot size, or top hat beam profile, of about 10 microns. The pulse energy used for high-speed ablative processing of semiconductors using this focused spot size is greater than 200 µJ per pulse at pulse repetition frequencies greater than 5 kHz and preferably above 15 kHz. The laser pulsewidth measured at the full width half-maximum points is preferably less than 80 ns.

57 Claims, 9 Drawing Sheets

U.S. PATENT DOCUMENTS

| | | | |
|---|---|---|---|
| 4,534,804 A | 8/1985 | Cade | 148/1.5 |
| 4,541,035 A | 9/1985 | Carlson et al. | 361/414 |
| 4,589,190 A | 5/1986 | Anthony | 29/571 |
| 4,618,380 A | 10/1986 | Alcorn et al. | 148/187 |
| 4,835,361 A | 5/1989 | Strom | 219/121.85 |
| 5,166,493 A | 11/1992 | Inagawa et al. | 219/121.71 |
| 5,543,365 A | 8/1996 | Wills et al. | 437/226 |
| 5,589,090 A | 12/1996 | Song | 219/121.62 |
| 5,593,606 A | 1/1997 | Owen et al. | 219/121.71 |
| 5,739,048 A | 4/1998 | Kerth et al. | 437/226 |
| 5,751,585 A | 5/1998 | Cutler et al. | 364/474.03 |
| 5,779,753 A | 7/1998 | Vetter et al. | 65/105 |
| 5,841,099 A | 11/1998 | Owen et al. | 219/121.69 |
| 5,843,363 A | 12/1998 | Mitwalsky et al. | 264/400 |
| 5,847,960 A | 12/1998 | Cutler et al. | 364/474.29 |
| 5,864,430 A | 1/1999 | Dickey et al. | 359/559 |
| 5,870,421 A | 2/1999 | Dahm | 372/75 |
| 5,872,684 A | 2/1999 | Hadfield et al. | 360/103 |
| 5,963,364 A | 10/1999 | Leong et al. | 359/352 |
| 5,987,725 A | 11/1999 | Church et al. | 29/407.05 |
| 6,001,268 A | 12/1999 | Nguyen et al. | 216/67 |
| 6,027,660 A | 2/2000 | Hsiao et al. | 216/22 |
| 6,032,997 A | 3/2000 | Elliott et al. | 294/64.1 |
| 6,037,565 A | 3/2000 | Hackel et al. | 219/121.73 |
| 6,057,180 A | 5/2000 | Sun et al. | 438/132 |
| 6,060,684 A | 5/2000 | Moriike | 219/121.72 |
| 6,063,695 A | 5/2000 | Lin et al. | 438/462 |
| 6,069,769 A | 5/2000 | Dorius et al. | 360/103 |
| 6,130,009 A | 10/2000 | Smith et al. | 430/1 |
| 6,255,621 B1 | 7/2001 | Lundquist et al. | 219/121.72 |
| 6,288,873 B1 | 9/2001 | Lundquist et al. | 360/234.6 |
| 6,356,337 B1 | 3/2002 | Zemel | 355/26 |
| 6,376,797 B1 * | 4/2002 | Piwczyk et al. | 219/121.72 |
| 6,420,245 B1 | 7/2002 | Manor | 438/460 |
| 6,423,925 B1 | 7/2002 | Sukhman et al. | 219/121.6 |
| 2001/0034564 A1 | 10/2001 | Jones | 700/166 |
| 2002/0033558 A1 | 3/2002 | Fahey et al. | 264/400 |

FOREIGN PATENT DOCUMENTS

| | | |
|---|---|---|
| JP | 11000773 | 1/1999 |
| JP | 11510740 T | 9/1999 |
| JP | 2000164535 | 6/2000 |
| WO | WO 97/35811 | 3/1997 |
| WO | WO 00/73013 | 12/2000 |
| WO | WO 01/52004 A1 | 7/2001 |
| WO | WO 02/24396 A1 | 3/2002 |

OTHER PUBLICATIONS

Lee, Rex A., et al., "Excimer vs ND:YAG Laser Creation of Silicon Vias for 3D Interconnects," IEEE/CHMT International Electronics Manufacturing Symposium (1992), pp. 358-360.

"Creation of an Air Bearing Surface by Excimer Laser Patterning of Ceramic," IBM Technical Disclosure Bulletin, Sep. 1991, US, vol. 34, Issue No. 4B, pp. 59-60; published Sep. 1, 1991, TDB-ACC-NO: NB910959.

"Method of Preventing Damage to Integrated Circuit Chips during Wafer Dicing," IBM Technical Disclosure Bulleting, May 1992, US, vol. 34, Issue No. 12, pp. 311-312, published May 1, 1992, TDB-ACC-NO: NN9205311.

Search Report concerning corresponding International Application No. PCT/US02/00867.

Written Opinion concerning corresponding International Application No. PCT/US02/00867.

Office action and English Translation concerning the corresponding Japanese Patent Application No. 560,818/2002.

US 6,303,409, 10/2001, Karpman et al. (withdrawn)

* cited by examiner

FIG. 2   GaAs Absorption Coefficient

ULTRAVIOLET LASER ABLATIVE PATTERNING OF MICROSTRUCTURES IN SEMICONDUCTORS

RELATED APPLICATIONS

This patent application derives priority from U.S. Provisional Application No. 60/265,556, filed Jan. 31, 2001, from U.S. Provisional Application No. 60/297,218, filed Jun. 8, 2001, is a division of U.S. patent application Ser. No. 09/957,633, filed Sep. 19, 2001 (now abandoned), which claims priority from U.S. Provisional Application No. 60/233,914, filed Sep. 20, 2000, and is a division of U.S. patent application Ser. No. 09/803,382, filed Mar. 9, 2001 (now abandoned), which claims priority from U.S. Provisional Application No. 60/233,913, filed Sep. 20, 2000.

TECHNICAL FIELD

This invention relates to a method and/or apparatus for high-speed formation of micron-scale features by ablation of semiconductors, and particularly silicon, using pulsed output of an ultraviolet (UV) laser.

BACKGROUND OF THE INVENTION

The semiconductor industry utilizes numerous techniques to separate distinct electronic devices, often referred to as die, from the semiconductor wafer upon which devices are fabricated. A common method for such separation is the use of a diamond saw. Methods for reducing the area on the semiconductor wafer required to be allocated for saw streets are much desired to enable greater area utilization of the wafer for useful die, thereby increasing the yield of die per wafer. Laser technology offers such an opportunity to reduce the street dimensions for dicing of semiconductor wafers.

The use of infrared lasers, such as Q-switched 1064 nm Nd:YAG lasers, for laser processing of silicon is well known to those skilled in the art. However, since silicon is a weak absorber at 1064 nm, significant problems have been encountered in laser dicing processes operating at or near this wavelength. The cut quality is typically observed to be marred by redeposition of silicon along the wafer surface and along the walls of the cut.

U.S. Pat. No. 4,541,035 of Carlson et al. and U.S. Pat. No. 4,589,190 of Anthony describe fabrication of features in silicon devices using 1064 nm pulsed output such as from an acousto-optic Q-switched, infrared (IR) Nd:YAG laser integrated into an ESI Model 25 Laser Scribing System. (See also "Diodes Formed by Laser Drilling and Diffusion," T. R. Anthony, Journal of Applied Physics, Vol. 53, December 1982, pp. 9154–9164). U.S. Pat. No. 4,618,380 of Alcorn et al. also describes a method of fabricating an imaging spectrometer by processing a silicon device with a laser.

In U.S. Pat. No. 5,543,365, Wills et al. describe a laser scribing apparatus for the purpose of forming polysilicon streaks in silicon wafers using 1064 nm pulsed output such as from a Nd:YAG laser with a pulsewidth exceeding 4 ns. Alternatively, they teach that the frequency-doubled wavelength of 532 nm may be employed.

In "Excimer VS Nd:YAG Laser Creation of Silicon Vias for 3D Interconnections" (1992 IEEE/CHMT Int'l Electronics Manufacturing Technology Symposium), Lee et. al. (Lee) report use of Nd:YAG laser wavelengths at 1064 nm and 532 nm to create vias throughout the surface of a silicon wafer for the purpose of enabling production of multichip modules. Lee reports that when laser drilling through holes in silicon wafers at 1064 nm, molten material frequently condensed onto the walls of the holes once an appreciable depth was reached. This apparent redeposition of silicon made the holes unsuitable for further processing. Lee reports employment of a double drilling process at 1064 nm to improve hole quality. Lee describes employing 532 nm frequency-doubled pulsed laser output from a lamp-pumped, Q-switched Nd:YAG in a trepanning process using rotating lenses that are offset with respect to the incoming laser beam to cut 4 mil (approximately 100 micron (μm)) diameter holes in silicon. He reports the processing parameters used as 833 μJ per pulse at a pulse repetition frequency of 3 kHz with a pulsewidth of 70 ns. Redeposition of silicon around the perimeter and along the walls of the laser drilled via was still observed and a chemical etching process was used to clean the holes.

Lee further reports on using an excimer laser at a wavelength of 248 nm to drill holes in silicon. Holes with very smooth sidewalls were reported due to the very high pulse energies employed. He reports using an energy per pulse of 290 mJ at a pulse repetition frequency of 250 Hz and a focused spot size of 5 mils (approximately 125 μm) to drill a hole through a silicon wafer in 30 seconds. He compared drilling time to the 3 seconds required for the holes drilled using his 532 nm Nd:YAG trepanning technique. Lee suggests a method for reducing the drilling time required for silicon holes by a 248 nm excimer laser through use of a projection technique. As those skilled in the art will recognize, such a technique is reliant upon an appropriate aperture mask for each pattern of holes to be formed using such a technique.

In U.S. Pat. No. 5,870,421, Dahm discusses the problem of use of near infrared lasers for the purpose of dicing silicon wafers. He teaches that the primary cause for poor cut quality resulting from redeposition when employing near infrared lasers is use of laser pulsewidths exceeding about 1 ns. Dahm teaches the use of near infrared lasers with short pulsewidths of less than about 1 ns to solve the deep absorption depth of near infrared wavelengths in silicon, stating that such short pulsewidths may produce surface plasmas which can act as highly absorbing layers. Dahm also mentions that near infrared lasers, such as 1064 nm Nd:YAG lasers, are used for high speed applications because of their ability to produce greater power than UV lasers, arguing that UV lasers cannot develop sufficient power to process silicon at high speeds.

In U.S. Pat. No. 5,593,606, Owen et al. describe advantages of employing UV laser systems to generate laser output pulses within advantageous parameters to form vias through at least two layers of multilayer devices. These parameters generally include nonexcimer output pulses having temporal pulse widths of shorter than 100 ns, spot areas with spot diameters of less than 100 μm, and average intensities or irradiances of greater than 100 mW over the spot areas at repetition rates of greater than 200 Hz.

In U.S. Pat. No. 5,841,099, Owen et al. vary UV laser output within similar parameters to those described above to have different power densities while machining different materials. They change the intensity by changing the repetition rate of the laser to change the energy density of the laser spot impinging the workpiece and/or they change the spot size.

In U.S. Pat. No. 5,751,585, Cutler et al. describe a high speed, high accuracy multi-stage positioning system for accurately and rapidly positioning a wide variety of tools, such as a laser beam relative to targets on a workpiece. They employ a multi-rate positioner system which processes workpiece target positioning commands and converts them to commands to slow and fast positioners. These positioners move without necessarily stopping in response to a stream of positioning data. In one embodiment, this technique enables the laser micromachining of a pattern of small features across a large workpiece, thereby allowing increased throughput of laser micromachined parts.

SUMMARY OF THE INVENTION

An object of the invention is to provide an improved method for using a laser to create microfeatures in semiconductors, including silicon, gallium arsenide (GaAs), silcon carbide (SiC), silicon nitride (SiN), and/or Ge:Si, and/or also including such semiconductors subsequently treated in semiconductor processes, including but not limited to photolithography and etching, well known to those skilled in the art to contain additional layers for the purpose of creating useful electronic and optoelectronic circuits on semiconductor substrates, including semiconductor wafers.

Another object of the invention is to provide such a method that employs a highly reliable nonexcimer UV laser capable of operating with high pulse energy output at high pulse repetition frequencies.

The present invention provides a method for rapidly and directly forming patterns with feature sizes of less than 50 µm in semiconductor workpieces using ultraviolet laser ablation. A compound beam positioner is used to rapidly position at the workpiece the focused output of a nonexcimer UV laser capable of emitting high energy per pulse output at high pulse repetition frequencies. These patterns may include: formation of very high-aspect cylindrical openings, such as through-holes or blind vias, for integrated circuit connections; curvilinear or rectilinear singulation of processed dies contained on silicon wafers; microtab cutting to separate microcircuits formed in semiconductor workpieces from parent wafer; formation of curvilinear or rectilinear features in optical waveguides, such as arrayed waveguide gratings (AWGs) or microelectronic machine systems (MEMS); and scribing alignment, identification, or other markings into the wafer surface.

The present invention utilizes laser wavelengths shorter than 390 nm for which the optical absorption coefficient of silicon is more than 1000 times greater than at the wavelength of 1064 nm used in U.S. Pat. Nos. 4,541,035, 4,589,190, and 5,543,365. A Q-switched frequency-tripled Nd:YAG, Nd:YVO$_4$, or Nd:YLF diode-pumped laser provides the preferred source of the ablative ultraviolet output. The laser's optical system produces a Gaussian spot size of about 10 µm. Alternatively, an optical system producing a top hat beam profile may be used. Exemplary pulse energy for high-speed ablative processing of silicon using this focused spot size is greater than 200 µJ per pulse at pulse repetition frequencies of greater than 5 kHz and preferably above 15 kHz. The laser pulsewidth measured at the full width half-maximum points is preferably less than 80 ns.

An advantage of using UV wavelengths is the capability of producing spot sizes significantly smaller than those achievable with longer wavelength sources. This small spot size capability enables the production of micron-scale feature sizes in silicon. Also, for a fixed spot size achievable with conventional Gaussian focusing techniques, a shorter wavelength allows for formation of features with improved aspect ratios due to the greater depth of focus afforded at ultraviolet wavelengths.

The present invention also provides methods for reducing damage or marring of processed semiconductor workpieces resulting from stray reflections of the ultraviolet processing beam from workpiece supporting structures, such as wafer chucks, by use of substantially nonreflecting materials and novel fabrication techniques for workpiece supporting structures.

Additional objects and advantages of this invention will be apparent from the following detailed description of preferred embodiments thereof which proceeds with reference to the accompanying drawings.

DETAILED DESCRIPTION OF PREFERRED EMBODIMENTS

Figure 1:
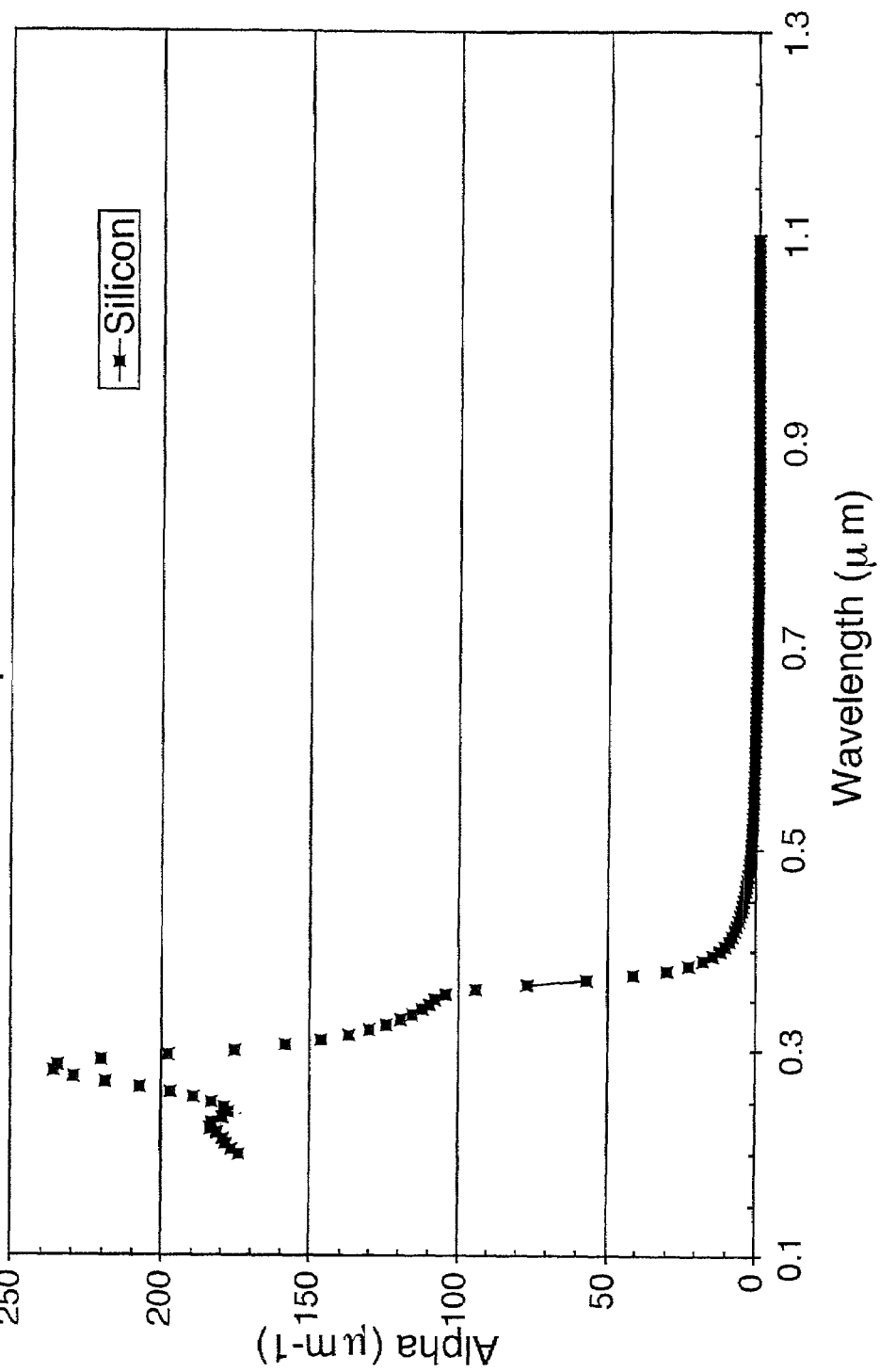
FIG. 1 is a graph displaying the optical absorption coefficient of silicon as a function of wavelength.

FIG. 1 displays the optical absorption coefficient of silicon as a function of wavelength. With reference to FIG. 1, silicon exhibits a very sharp rise in the optical absorption at wavelengths in the ultraviolet. The present invention advantageously utilizes laser wavelengths shorter than 390 nm and takes advantage of the increased absorption of silicon in the ultraviolet to efficiently ablate silicon and thereby form a variety of useful patterns or features directly in silicon. The absorption behavior facilitates strongly ablative removal of silicon in the ultraviolet with a greatly reduced thermally affected zone in comparison with features formed using either 532 nm or 1064 nm pulsed output as taught by the prior art.

Figure 2:
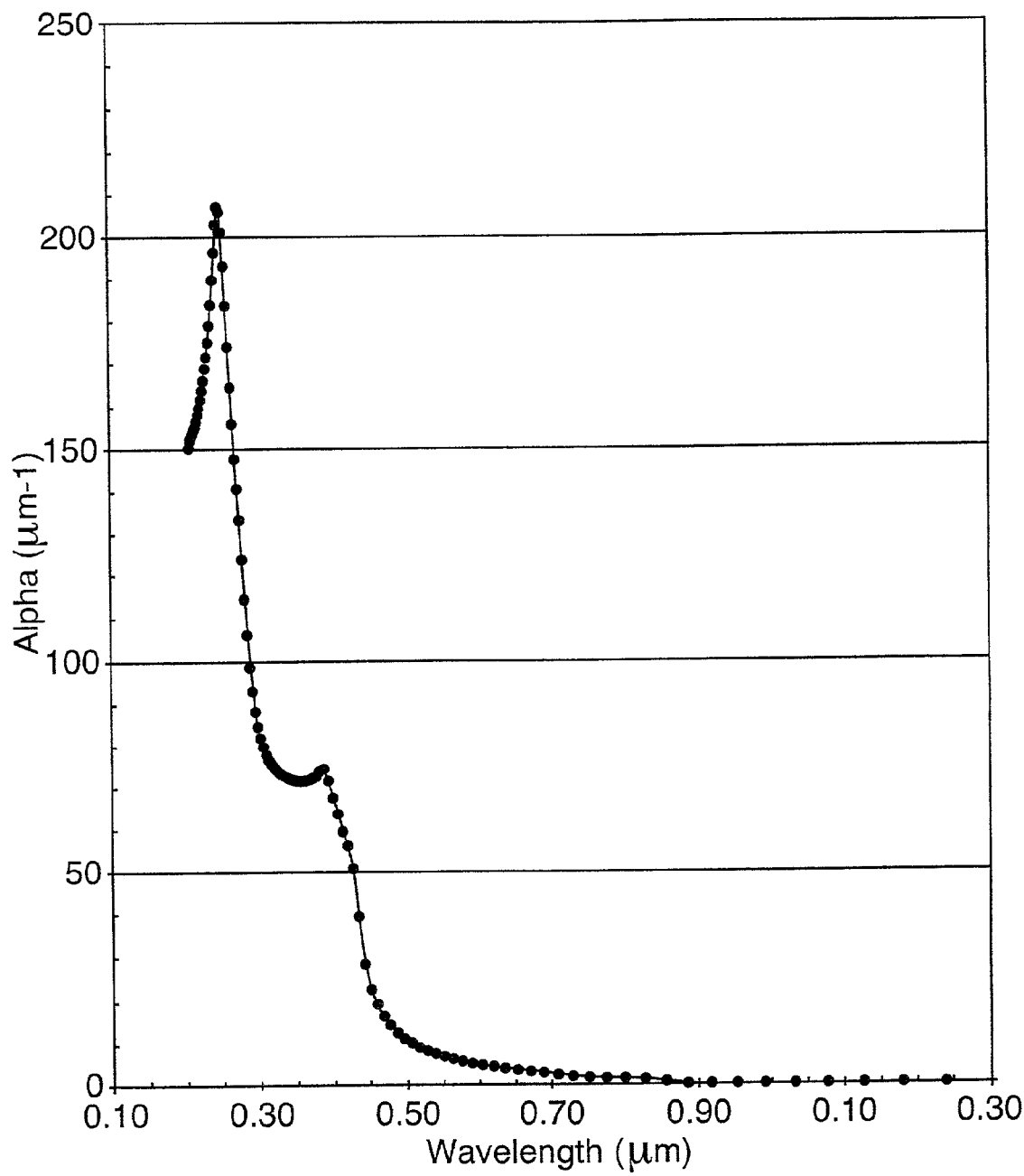
FIG. 2 is a graph displaying the optical absorption coefficient of gallium arsenide (GaAs) as a function of wavelength.

FIG. 2 displays the optical absorption coefficient of GaAs as a function of wavelength. With reference to FIG. 2, GaAs exhibits a very sharp rise in the optical absorption at wavelengths in the ultraviolet. The absorption coefficient at 355 nm of GaAs and silicon are quite close. GaAs is a key material in optoelectronic devices, such as diode lasers and detectors.

Figure 3:
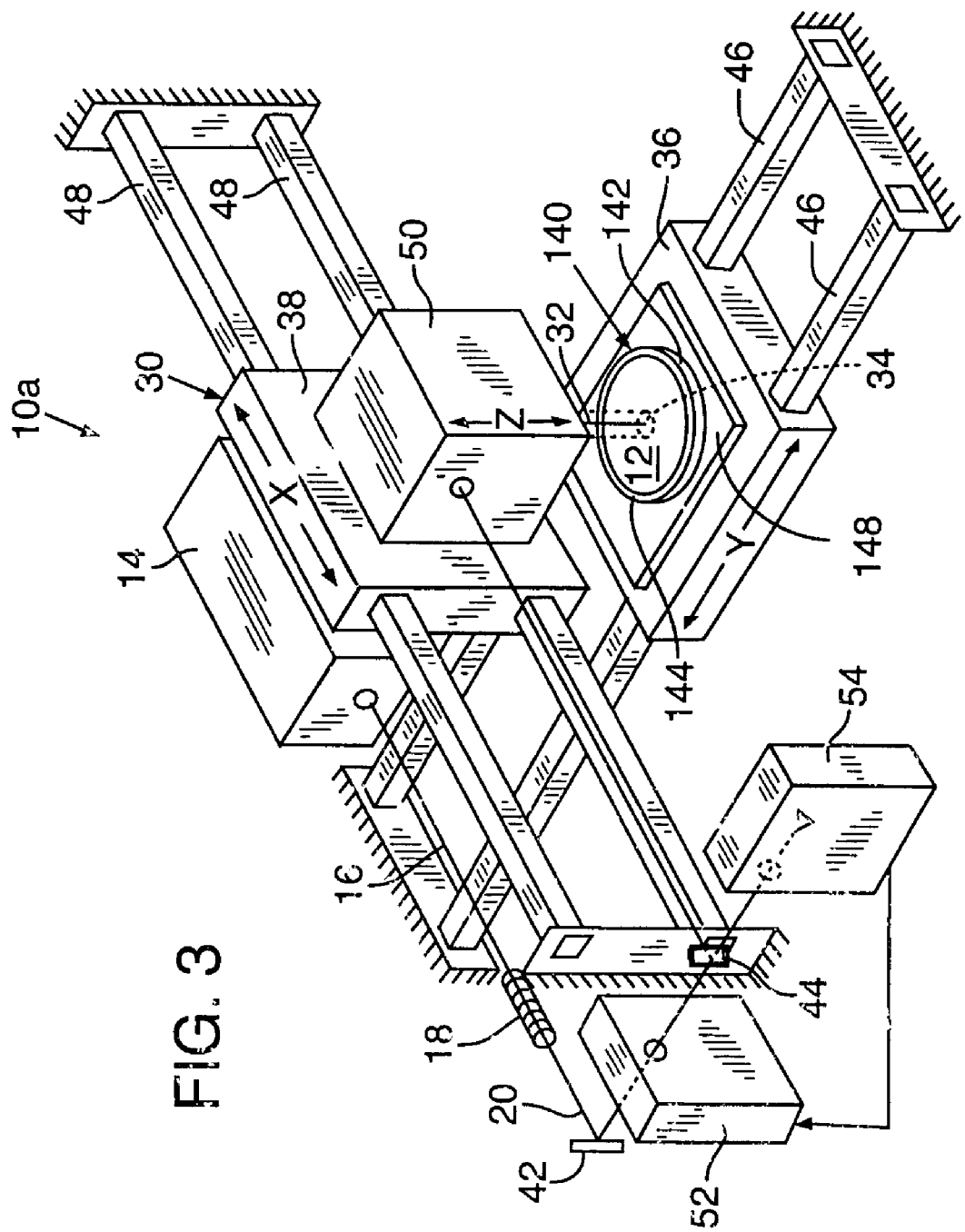
FIG. 3 is a simplified pictorial diagram of a preferred laser system for ultraviolet laser ablative patterning of microstructures in semiconductors in accordance with the present invention.
Figure 4:
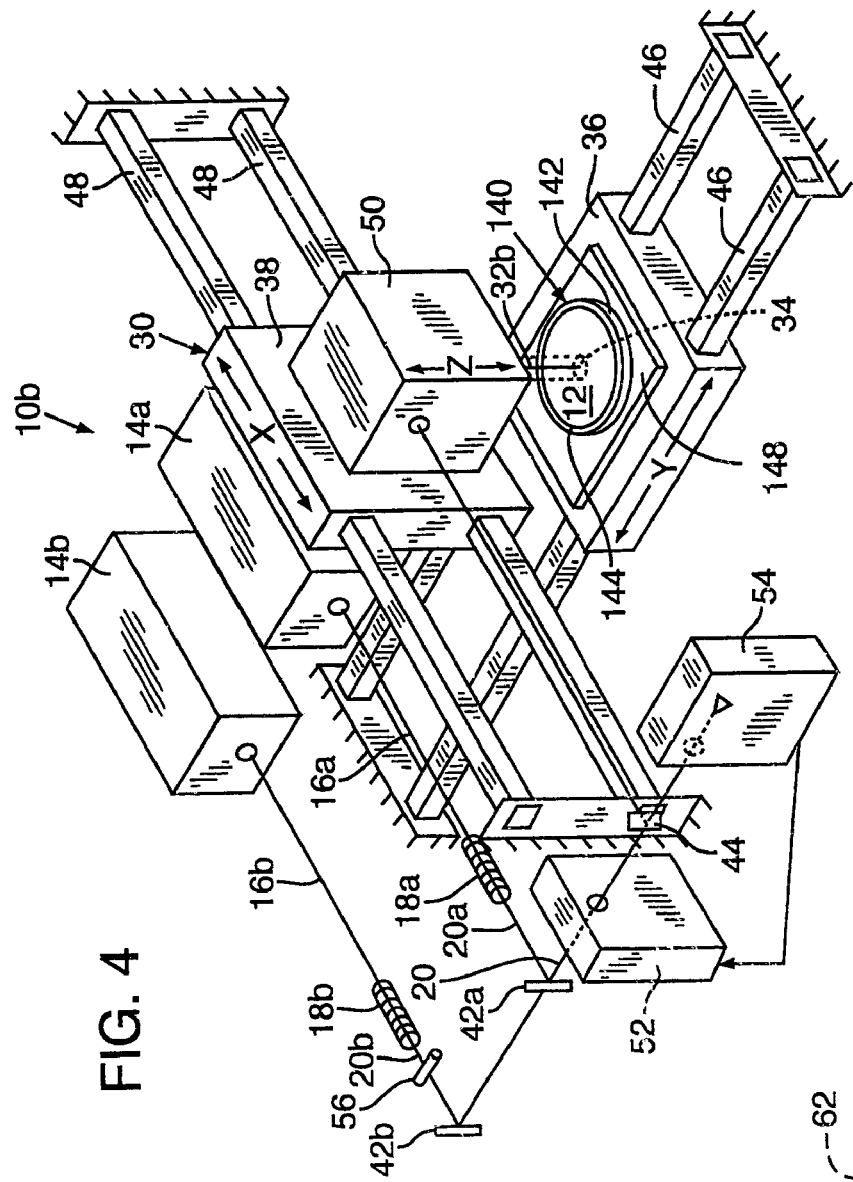
FIG. 4 is a simplified pictorial diagram of an alternative preferred laser system for ultraviolet laser ablative patterning of microstructures in semiconductors.

FIGS. 3 and 4 illustrate alternative preferred embodiments of respective laser processing systems 10a and 10b (generically 10) utilizing a compound beam positioning system 40 equipped with a wafer chuck assembly 140 that can be employed for ultraviolet laser ablative patterning of microstructures in semiconductor workpieces 12 in accordance with the present invention. With reference to FIGS. 3 and 4, a preferred embodiment of a laser system 10 includes a Q-switched, diode-pumped (DP), solid-state (SS) UV laser 14 that preferably includes a solid-state lasant such as Nd:YAG, Nd:YLF, or Nd:YVO$_4$. Laser 14 preferably provides harmonically generated UV laser output 16 of one or more laser pulses at a wavelength such as 355 nm (frequency tripled Nd:YAG), 266 nm (frequency quadrupled Nd:YAG), or 213 nm (frequency quintupled Nd:YAG) with primarily a TEM$_{00}$ spatial mode profile.

Although Gaussian may be used to describe the irradiance profile of laser output 16, skilled persons will appreciate that most lasers 14 do not emit perfect Gaussian output 16 having a value of $M^2=1$. For convenience, the term Gaussian is used herein to include profiles where $M^2$ is less than or equal to about 1.5, even though $M^2$ values of less than 1.3 or 1.2 are preferred.

In a preferred embodiment, laser 14 includes a Model 210-V06 Q-switched, frequency-tripled Nd:YAG laser, operating at about 355 nm, and commercially available from Lightwave Electronics. This laser has been employed in the ESI Model 2700 microvia drilling system available from Electro Scientific Industries, Inc. of Portland, Oreg. In an alternative embodiment, a Lightwave Model 210-V09 Q-switched, frequency-tripled Nd:YAG laser, operating at about 355 nm may be employed in order to employ high energy per pulse at a high pulse repetition frequency (PRF). Skilled persons will appreciate that other lasers could be employed and that other wavelengths are available from the other listed lasants. Although laser cavity arrangements, harmonic generation, and Q-switch operation, and positioning systems are all well known to persons skilled in the art, certain details of some of these components will be presented within the discussions of the preferred embodiments.

UV laser output 16 is optionally passed through a variety of well-known expansion and/or collimation optics 18, propagated a long an optical path 20, and directed by a beam positioning system 30 to impinge laser system output pulse(s) 32 on a desired laser target position 34 on workpiece 12. Beam positioning system 30 preferably includes a translation stage positioner that preferably employs at least two transverse stages 36 and 38 that support, for example, X, Y, and/or Z positioning mirrors 42 and 44 and permit quick movement between target positions 34 on the same or different workpieces 12.

In a preferred embodiment, the translation stage positioner is a split-axis system where a Y stage 36, typically moved by linear motors along rails 46, supports and moves workpiece 12, and an X stage 38, typically moved by linear motors along rails 48, supports and moves a fast positioner 50 and associated focusing lens(es). The Z dimension between X stage 38 and Y stage 36 may also be is adjustable. The positioning mirrors 42 and 44 align the optical path 20 through any turns between laser 14 and fast positioner 50, which is positioned along the optical path 20. The fast positioner 50 may for example employ high resolution linear motors or a pair of galvanometer mirrors that can effect unique or repetitive processing operations based on provided test or design data. The stages 36 and 38 and positioner 50 can be controlled and moved independently or coordinated to move together in response to panelized or unpanelized data.

Fast positioner 50 preferably also includes a vision system that can be aligned to one or more fiducials on the surface of the workpiece 12. Beam positioning system 30 can employ conventional vision or beam to work alignment systems that work through objective lens 36 or off axis with a separate camera and that are well known to skilled practitioners. In one embodiment, an HRVX vision box employing Freedom Library software in a positioning system 30 sold by Electro Scientific Industries, Inc. is employed to perform alignment between the laser system 10 and the target locations 34 on the workpiece 12. Other suitable alignment systems are commercially available. The alignment systems preferably employ bright-field, on-axis illumination, particularly for specularly reflecting workpieces like lapped or polished wafers.

In addition, beam positioning system 30 also preferably employs non-contact, small-displacement sensors to determine Abbe errors due to the pitch, yaw, or roll of stages 36 and 38 that are not indicated by an on-axis position indicator, such as a linear scale encoder or laser interferometer. The Abbe error correction system can be calibrated against a precise reference standard so the corrections depend only on sensing small changes in the sensor readings and not on absolute accuracy of the sensor readings. Such an Abbe error correction system is described in detail in International Publication No. WO 01/52004 A1 published on Jul. 19, 2001 and U.S. Publication No. 2001–0029674 A1 published on Oct. 18, 2001. The relevant portions of the disclosure of the corresponding U.S. patent application Ser. No. 09/755,950 of Cutler are herein incorporated by reference.

Many variations of positioning systems 30 are well known to skilled practitioners and some embodiments of positioning system 30 are described in detail in U.S. Pat. No. 5,751,585 of Cutler et al. The ESI Model 5320 microvia drilling system available from Electro Scientific Industries, Inc. of Portland, Oregon is a preferred implementation of positioning system 30 and has been used for laser drilling of resin coated copper packages for the electronics industry. Other preferred positioning systems such as a Model series numbers 27xx, 43xx, 44xx, or 53xx, manufactured by Electro Scientific Industries, Inc. in Portland, Oreg., can also be employed. Some of these systems which use an X-Y linear motor for moving the workpiece 12 and an X-Y stage for moving the scan lens are cost effective positioning systems for making long straight cuts. Skilled persons will also appreciate that a system with a single X-Y stage for workpiece positioning with a fixed beam position and/or stationary galvanometer for beam positioning may alternatively be employed. Those skilled in the art will recognize that such a system can be programmed to utilize toolpath files that will dynamically position at high speeds the focused UV laser system output pulses 32 to produce a wide variety of useful patterns, which may be either periodic or non-periodic. Those skilled in the art will also recognize that this capability has many advantages over the suggestion made by Lee to produce vias in silicon through use of a projection imaging arrangement.

An optional laser power controller 52, such as a half wave plate polarizer, may be positioned along optical path 20. In addition, one or more beam detection devices 54, such as photodiodes, may be downstream of laser power controller 52, such as aligned with a positioning mirror 44 that is adapted to be partly transmissive to the wavelength of laser output 16. Beam detection devices 54 are preferably in communication with beam diagnostic electronics that convey signals to modify the effects of laser power controller 52.

With reference to FIG. 4, laser system 10b preferably employs at least two lasers 14a and 14b that emit respective laser outputs 16a and 16b that are linearly polarized in transverse directions and propagate along respective optical paths 20a and 20b toward respective reflecting devices 42a and 42b. An optional waveplate 56 may be positioned along optical path 20b. Reflecting device 42a is preferably a polarization sensitive beam combiner and is positioned along both optical paths 20a and 20b to combine laser outputs 16a and 16b to propagate along the common optical path 20.

Lasers 14a and 14b may be the same or different types of lasers and may produce laser outputs 16a and 16b that have the same or different wavelengths. For example, laser output 16a may have a wavelength of about 266 nm, and laser output 16b may have a wavelength of about 355 nm. Skilled persons will appreciate that lasers 14a and 14b may be mounted side by side or one on top of the other and both attached to one of the translation stages 36 or 38. Laser system 10b is capable of producing very high energy laser output pulses 32b. A particular advantage of the arrangement shown in FIG. 4 is to produce a combined laser output 32 impinging on the work surface having an increased energy per pulse which could be difficult to produce from a conventional single laser head. Such an increased energy per pulse can be particularly advantageous for ablating deep trenches or deep cylindrical openings in thick silicon wafers.

Figure 5:
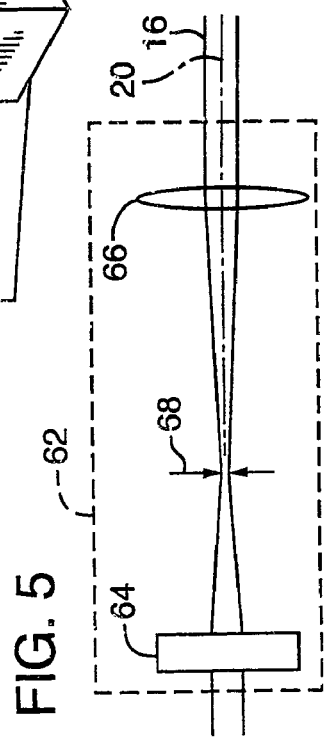
FIG. 5 is a simplified pictorial diagram of an optional imaged optics module that may be used in a laser system for ultraviolet laser ablative patterning of microstructures in semiconductors.

Despite the substantially round profile of laser system output pulse 32, improved beam shape quality can be achieved with an optional imaged optics module 62 whereby unwanted beam artifacts, such as residual astigmatism or elliptical or other shape characteristics, are filtered spatially. With reference to FIG. 5, image optics module 62 preferably includes an optical element 64, a lens 66, and an aperture mask 68 placed at or near the beam waist created by the optical element 64 to block any undesirable side lobes and peripheral portions of the beam so that a precisely shaped spot profile is subsequently imaged onto the work surface. In a preferred embodiment, optical element 64 is a focusing lens, and lens 66 is a collimating lens to add flexibility to the configuration of laser system 48.

Varying the size of the aperture can control the edge sharpness of the spot profile to produce a smaller, sharper-edged intensity profile that should enhance the alignment accuracy. In addition, with this arrangement, the shape of the aperture can be precisely circular or also be changed to rectangular, elliptical, or other noncircular shapes that can be aligned parallel or perpendicular to a cutting direction. The aperture of mask 68 may optionally be flared outwardly at its light exiting side. In imaged optics module 62, mask 68 may comprise a UV reflective or UV absorptive material, but is preferably made from a dielectric material such as UV grade fused silica or sapphire coated with a multilayer highly UV reflective coating other UV resistant coating. Skilled persons will appreciate that aperture mask 68 can be used without optical elements 64 and 66.

In an alternative preferred embodiment, optical element 64 includes one or more beam shaping components that convert laser pulses having a raw Gaussian irradiance profile into shaped (and focused) pulses that have a near-uniform "top hat" profile, or particularly a super-Gaussian irradiance profile, in proximity to an aperture mask 68 downstream of optical element 64. Such beam shaping components may include aspheric optics or diffractive optics. In a preferred embodiment, lens 66 comprises imaging optics useful for controlling beam size and divergence. Skilled persons will appreciate that a single imaging lens component or multiple lens components could be employed. Skilled persons will also appreciate that shaped laser output can be employed without using an aperture mask 68.

In one preferred embodiment, the beam shaping components include a diffractive optic element (DOE) that can perform complex beam shaping with high efficiency and accuracy. The beam shaping components not only transform the Gaussian irradiance profile to a near-uniform irradiance profile, but they also focus the shaped output to a determinable or specified spot size. Although a single element DOE is preferred, skilled persons will appreciate that the DOE may include multiple separate elements such as the phase plate and transform elements disclosed in U.S. Pat. No. 5,864,430 of Dickey et al., which also discloses techniques for designing DOEs for the purpose of beam shaping. The shaping and imaging techniques discussed above are described in detail in International Publication No. WO 00/73013 published on Dec. 7, 2000. The relevant portions of the disclosure of corresponding U.S. patent application Ser. No. 09/580,396 of Dunsky et al., filed May 26, 2000 are herein incorporated by reference.

Figure 6:
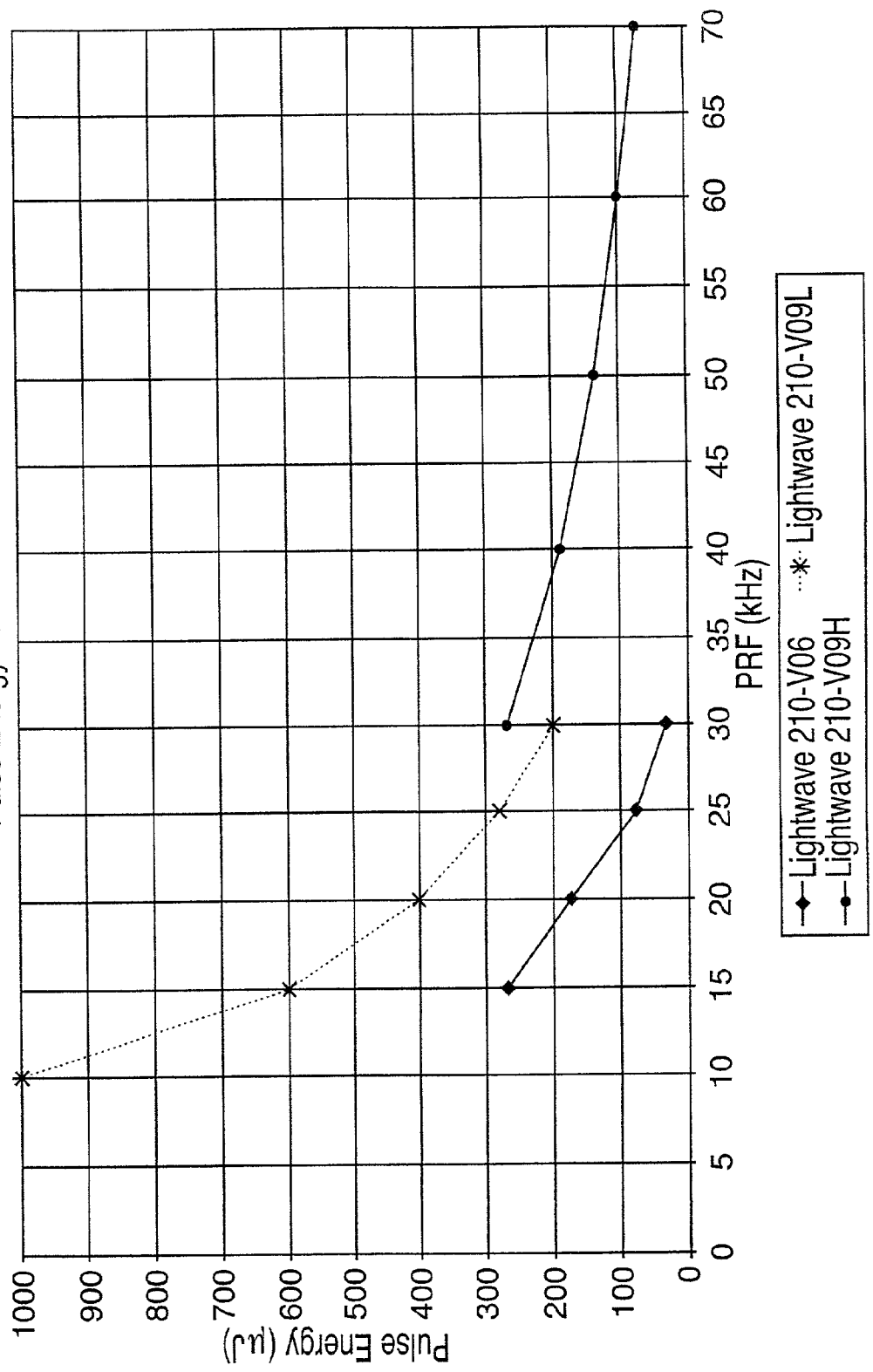
FIG. 6 is a graph displaying the characteristic relationship between pulse energy and pulse repetition frequency of the laser employed during practice of the invention.

For the purpose of providing increased flexibility in the dynamic range of energy per pulse, a fast response amplitude control mechanism, such as an acousto-optic modulator or electro-optic modulator may be employed to modulate the pulse energy of successive pulses. Alternatively, or in combination with the fast response amplitude control mechanism, the pulse repetition frequency may be increased or decreased to effect a change in the pulse energy of successive pulses. FIG. 6 displays the characteristic relationship between pulse energy and pulse repetition frequency (PRF) of a laser 14 employed during practice of the invention. As FIG. 6 indicates, pulse energies of greater than 200 µJ can be obtained from the Model 210-V06. In addition, the characteristic relationship between pulse energy and PRF for alternative lasers, Lightwave 210-V09L and Lightwave 210-V09H, are also shown. Those skilled in the art will appreciate that FIG. 6 is illustrative of the principal described and alternate embodiments of laser system 10 will produce different characteristic relationships between pulse energy and pulse repetition frequency.

The above-described performance characteristics of UV laser system 10 can be used for high-speed formation of micron-scale features by ablation of semiconductors, and particularly silicon. These features may include, but are not limited to, formation of very high aspect cylindrical openings 100 through or partially through silicon wafers or other silicon workpieces 12; formation of through or partially through trenches of complex geometry for the purpose of singulation of processed die on silicon wafers or silicon workpieces 12; formation of microtab features to separate microcircuits formed in silicon from parent wafers; formation of features on and/or singulation of AWGs; and formation of features in MEMS. In addition, the present invention facilitates feature formation without significant melt lip formation, without significant slag formation, and without significant peel back of the feature edge.

Figure 7:
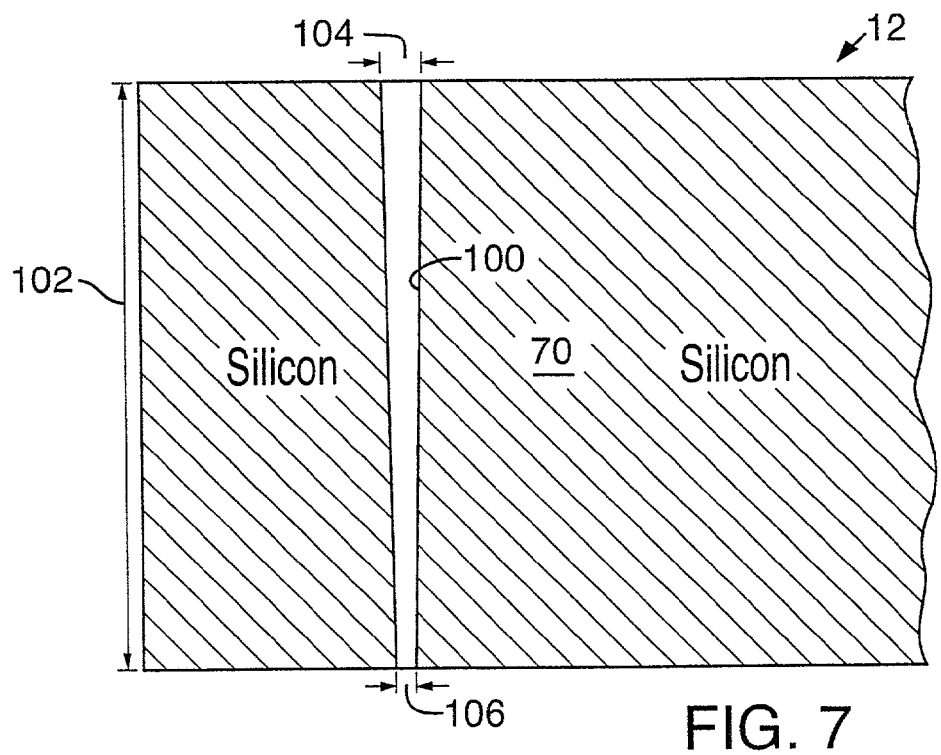
FIG. 7 is a representative illustration of ultraviolet ablative patterning of a cylindrical opening in silicon.

FIG. 7 presents a representative illustration of a cylindrical opening 100 formed by ultraviolet ablative patterning in a silicon workpiece 12 such as a wafer having 500 µm-thick intrinsic silicon substrate 70 overlaid with a 0.5 m-thick passivation layer of SiO$_2$ (not shown). Those skilled in the art will recognize that the thickness of the silicon workpieces and the thickness of the passivation layers will vary.

The cylindrical opening 100 is preferably patterned by positioning the target position 34 of the silicon workpiece 12 at the focal plane of laser system 10 and directing a series of laser system output pulses 32 at target position 34 on silicon workpiece 12. In this embodiment, laser system 10 is directed to move the silicon workpiece 12 in X and Y axes to a computer programmed centroid target position 34 of the desired location for cylindrical opening 100. The sequential laser system output pulses 32 are each incident on the programmed centroid target position 34.

For ablative patterning by sequential overlapping pulses, referred herein as punching, of cylindrical openings 100 in silicon workpieces, a preferred range of combined processing parameters, including energy per pulse, pulse repetition frequency (PRF), and focused spot size are particularly advantageous for rapid punching of useful cylindrical openings 100.

In a punching process, sequential laser system output pulses 32 are each incident on the programmed centroid target position 34 while workpiece 12 is fixed in X and Y axes positions. For this exemplary ablative patterning of silicon process, the preferred energy per pulse range is about 100 µJ to 1500 µJ, more preferably, a energy per pulse range of about 200 µJ to 1000 µJ, even more preferably from about 300 µJ to 800 µJ, and most preferably over about 360 µJ. The preferred PRF range is about 5 kHz to 100 kHz, and more preferably, a PRF range from about 7 kHz to 50 kHz, and most preferably, a PRF range from about 10 kHz to 30 kHz. The preferred focused spot size range is about 1 µm to 25 µm, and more preferably, a focused spot size range from about 3 µm to 20 µm, and most preferably, a focused spot size from about 8 µm to 15 µm. Those skilled in the art will recognize that the laser performance as shown in FIG. 6 can achieve energy per pulse output at PRFs within the most preferred ranges described above. In reduction to practice, programming of an ESI Model 2700 to operate with the most preferred process parameters resulted in a throughput of one hundred cylindrical openings per second, each cylindrical opening having a 35 µm diameter punched through on a 750 µm thick silicon wafer workpiece 12.

In another embodiment, the Z-height of the laser focus position is simultaneously moved coincident with each succeeding laser system output pulse 32 to place the laser focus at a sequentially deeper position in the silicon workpiece 12, thereby maintaining the focused spot at a position more coincident with the remaining silicon surface.

In a preferred embodiment, cylindrical opening 100 completely penetrates the entire thickness 102 of the workpiece 12 using an output pulse energy from the laser 14 of greater than 300 microjoules (µJ) using about 100 sequential laser system output pulses 32. Laser system output pulses 32 are incident at the work surface with a focused spot size ($1/e^2$) diameter of about 12 µm. The cylindrical opening 100 produced in this embodiment will typically have a top surface opening diameter ($d_t$) 104 of about 20 µm and an exit diameter ($d_b$) 106 of about 13 µm, thereby producing an aspect ratio for this through hole cylindrical opening of about 30:1 and an opening taper angle of 0.4°.

Persons skilled in the art will further appreciate that the precise values of energy per pulse, focused spot size, and number of pulses required to efficiently produce high quality cylindrical openings 100 through silicon may vary according to the thickness 102 of the silicon workpiece 12, relative thickness and composition of overlayers, of which SiO$_2$ is only one example, and the precise ultraviolet wavelength employed. For example, for production of through-hole cylindrical openings 100 in silicon for use as sites for direct conductive interconnection of an integrated circuit patterned on a silicon die to a printed circuit, the silicon may be only 50 µm thick, for example. In this example, as few as about ten pulses may be employed to produce the desired through-hole cylindrical opening 100. Those skilled in the art will realize that cylindrical openings, which do not completely penetrate through the entire thickness 102 of the silicon, (blind vias) can be produced through the correct selection of the parameters described.

Persons skilled in the art will appreciate that such cylindrical openings 100 through silicon with high aspect ratio and very low taper angle are very advantageous for electronic packaging and interconnect applications. In addition, one or more groups of these small through-hole cylindrical openings 100 can be positioned on the top side near the periphery of workpieces 12, circuits or dies, or within scribing, slicing, or dicing streets or their intersections such that the back or bottom side of workpiece 12 can be precisely aligned to with respect to features on the top side. Such alignment facilitates backside processing such as laser scribing or sawing to enhance processing speed or quality. Techniques for front and/or backside wafer slicing or dicing are discussed in more detail in U.S. patent application Ser. No. 09/803,382, filed Mar. 9, 2001, entitled UV Laser Cutting or Shape Modification of Brittle, High Melting Temperature Target Materials such as Ceramics or Glasses and in U.S. Prov. Pat. Appl. No. 60/301,701, filed Jun. 28, 2001, entitled Multi-Step Laser Processing for the Cutting or Drilling of Wafers with Surface Device Layers.

Figure 8:
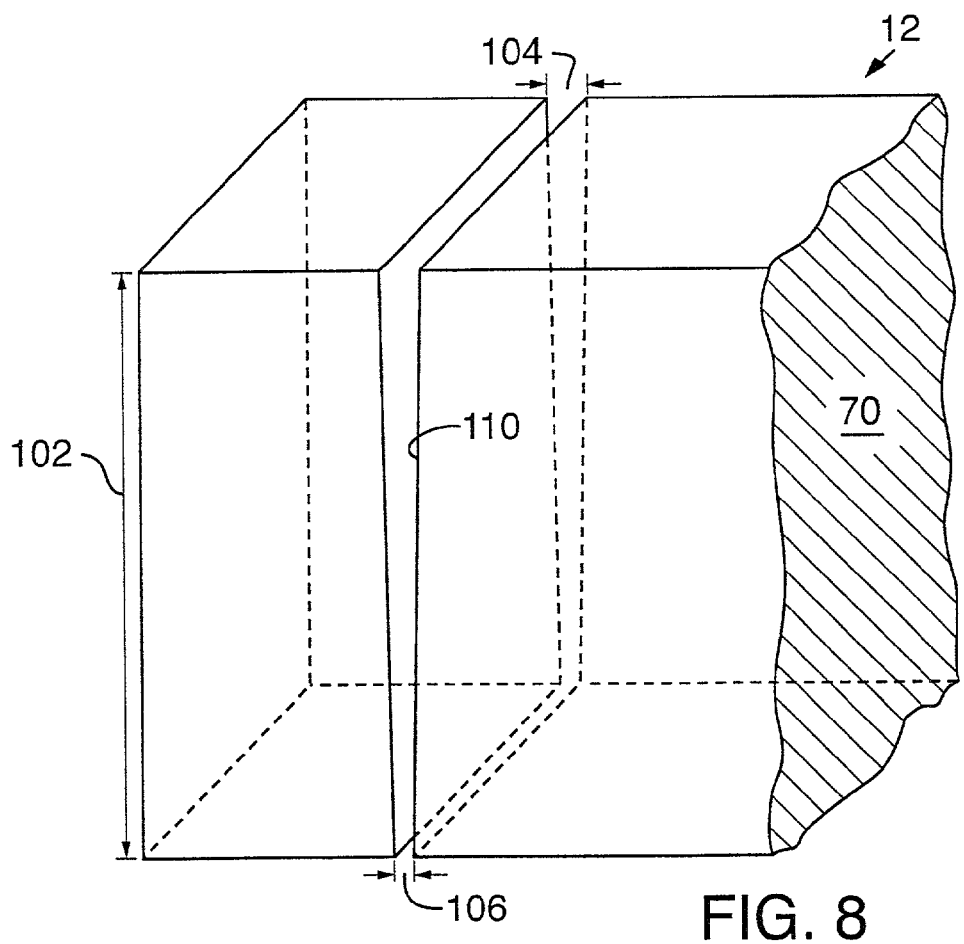
FIG. 8 is a representative illustration of ultraviolet ablative patterning of a trench pattern in silicon.

FIG. 8 is a representative illustration of ultraviolet ablative patterning of a trench 110 in a silicon workpiece 12. The trench 110 is preferably patterned by positioning the silicon workpiece 12 at the focal plane of the laser system 10 and directing a string of successively overlapping laser system output pulses 32 at the silicon workpiece 12 as the laser positioning system 30 moves workpiece 12 along the X-and/or Y-axes of the workpiece 12.

For the ablative patterning process for forming a trench in silicon, the preferred energy per pulse range is about 100 µJ to 1500 µJ and more preferably, a energy per pulse range of about 200 µJ to 1000 µJ, even more preferably from about 300 µJ to 800 µJ, and most preferably over about 360 µJ. The preferred PRF range is about 5 kHz to 100 kHz, and more preferably, a PRF range from about 7 kHz to 50 kHz, and most preferably, a PRF range from about 10 kHz to 30 kHz. The preferred focused spot size range is about 1 µm to 25 µm, and more preferably, a focused spot size range from about 3 µm to 20 µm, and most preferably, a focused spot size from about 8 µm to 15 µm. The preferred bite size range is about 0.1 µm to 10 µm, and more preferably, a bite size range from about 0.3 µm to 5 µm, and most preferably, a bite size from about 0.5 µm to 3 µm. The bite size can be adjusted by controlling the speed of either or both of the stages of the laser beam positioning system and coordinating the movement speed(s) with the repetition rate and firing of the laser.

In a preferred embodiment, a linear trench 110 is cut completely through 750 µm-thick intrinsic silicon overlaid with a 2.0 µm passivation layer of SiO$_2$ using an output pulse energy from the laser 14 of about 360 µJ and using a bite size of 1 µm with a stage velocity of 10 mm/s in 180 passes over workpiece 12. These laser pulses are incident at the work surface with a focused spot size ($1/e^2$) diameter of 12 µm.

Those skilled in the art will recognize that various patterns of varying geometry, including, but not limited to, squares, rectangles, ellipses, spirals, and/or combinations thereof, may be produced through programming of a tool path file used by laser system 10 and positioning system 30 to position silicon workpiece 12 along X and Y-axes during processing. For laser cutting, the beam positioning system 30 is preferably aligned to conventional typical saw cutting or other fiducials or a pattern on the wafer surface. If the wafers are already mechanically notched, alignment to the cut edges is preferred to overcome the saw tolerance and alignment errors.

Laser cutting destroys significantly less material (kerfs of less than 50 μm wide and preferably less than 25 μm wide) than does mechanical cutting (slicing lanes of about 300 μm and dicing paths of about 150 μm) so that devices on wafers can be manufactured much closer together, allowing many more devices to be produced on each wafer. Thus, the laser cutting process minimizes the pitch between rows and the pitch between devices.

Elimination of the mechanical cutting can also simplify manufacture of devices on workpieces 10. In particular, mechanical cutting can impart significant mechanical stress to devices such that they come off their carriers. To avoid losing rows, device manufacturers may employ strong adhesives or epoxies between the rows and the carrier. An all laser process significantly reduces the mechanical strength requirements of the adhesive used for fixturing the rows onto a carrier. Laser cutting, therefore, permits the elimination of strong adhesives or epoxies used to affix the rows to the carrier and the harsh chemicals needed to remove them. Instead, the adhesives can be selected for ease of debonding, such as the reduction of debond time and less exposure to potentially corrosive chemicals, and for amenability to UV laser processing, greatly reducing risk of damage to the devices, and thereby enhancing yield.

Laser row slicing reduces row bow because laser slicing does not exert as much mechanical stress as mechanical slicing. However, if row bow or other of the row defects are apparent, the rows can be laser diced (and re-sliced) to compensate for these defects without concern for the critical device to device alignment needed between rows for mechanical dicing. For convenience, the term (through) cutting may be used generically to include slicing (often associated with wafer row separation) or dicing (often associated with part singulation from wafer rows), and slicing and dicing may be used interchangeably in the context of this invention.

Because positioning system 30 can align to through holes 100 or fiducials, laser system 10 can process each row and/or each device independently. With respect to slanted rows, the laser spot can perform traverse cuts across the slanted rows at appropriate positions with respect to outer edges of the devices with stage and/or beam translations between each cut to effect a rectangular or curvilinear wave patterns as desired. Thus, laser dicing can compensate for row fixturing defects and perhaps save entire rows of devices that would be ruined by mechanical dicing.

UV laser cutting throughput through silicon and like materials can be improved by dividing a long cut path into short segments. For through cutting or trench cutting in thick silicon, for example, these segments are preferably from about 10 μm to 1 mm, more preferably from about 100 μm to 1000 μm, and most preferably from about 200 μm to 500 μm. The laser beam is scanned within a first short segment for a predetermined number of passes before being moved to and scanned within a second short for a predetermined number of passes. The bite size, segment size, and segment overlap can be manipulated to minimize the amount and type of trench backfill.

Figure 9:
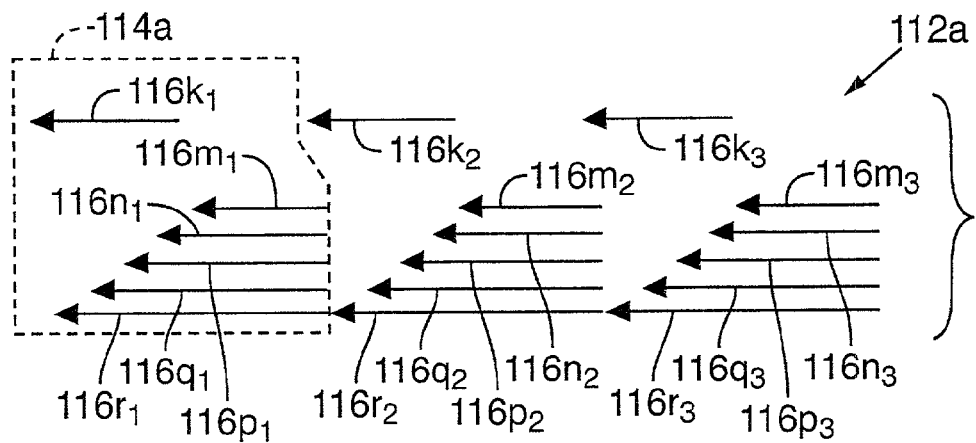
FIG. 9 is a simplified representation of an exemplary segmented cutting profile for making long cuts in semiconductor materials.

FIG. 9 depicts a simplified representation of an exemplary segmented cutting profile 112a. With reference to FIG. 9, cutting profile 112a is shown, for convenience, having an path cutting direction from left to right and having distinct cutting segments $116k_1$–$116r_3$ (generally, cutting segments 116) formed from right to left. Although cutting segments $116k_1$–$116r_3$ are depicted as parallel in FIG. 9 for convenience, cutting segments $116k_1$–$116r_3$ are actually collinear. FIG. 9 depicts multiple segment sets 114a, each comprising an initial segment 116k and multiple gradually lengthening overlapping segments 116m–116r, preferably processed in alphabetical order. Preferably, each set 114a is processed to a selected intermediate depth or to a complete through cut before the next set is processed. Although only five overlapping segments are shown for each set 114a, skilled persons will appreciate that a substantially greater number of overlapping segments 116 could be employed, particularly with smaller incremental length increases as needed to accommodate the thickness of the target material. Skilled persons will also appreciate that any or all of the segments 116 employed in cutting profile 112a could be processed in both directions instead of a single direction as shown in FIG. 9.

Figure 10:
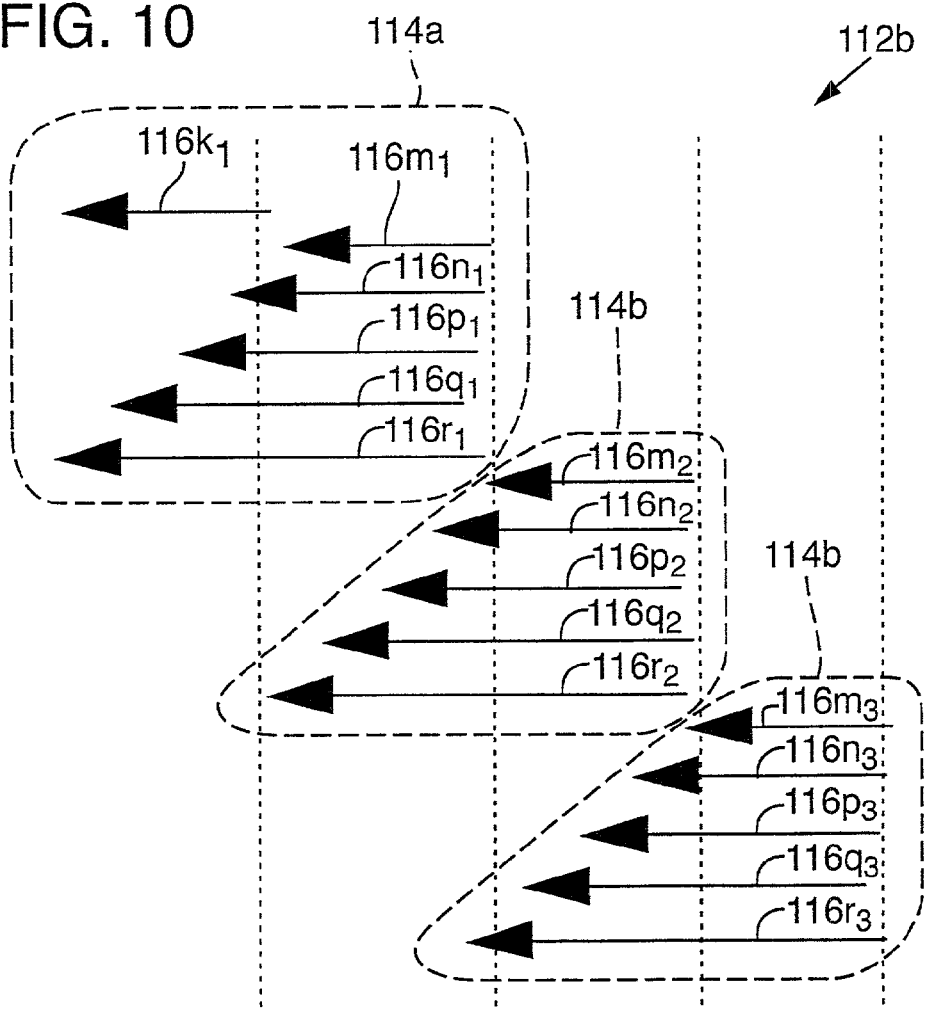
FIG. 10 is a simplified representation of an alternative segmented cutting profile for making long cuts in semiconductor materials.

FIG. 10 depicts a simplified representation of an exemplary segmented cutting profile 112b that is somewhat similar to profile 112a. With reference to FIG. 10, profile 112b begins with the same segment set 114a that begins profile 112a. However, segment sets 114b omit segments 116k and increasingly overlap the previously processed segment sets as much as 60%. In one example of this embodiment, segment $116k_1$ is cut with 30 passes and has a length of 200 μm. Then, segment $116m_1$ is cut with 6 passes (⅕ of 30 passes) and has a length of 240 μm (200 μm plus ⅕ of the length of segment $116k_1$). Then, segment $116n_1$ is cut with 6 passes and has a length of 280 μm (200 μm plus ⅖ of the length of segment $116k_1$). This sequence is continued until segment set 114b is completed. This example can exhibit dicing speeds of greater than or equal to 8.5 mm/minute.

Real-time monitoring can also be employed to reduce rescanning portions of the cut path where the cut is already completed. In addition, polarization direction of the laser beam can be correlated with the cutting direction to further enhance throughput. These segmented cutting techniques are discussed in detail in U.S. Provisional Patent Application No. 60/297,218, filed Jun. 8, 2001, entitled Laser Segmented Slicing or Dicing.

Figure 11:
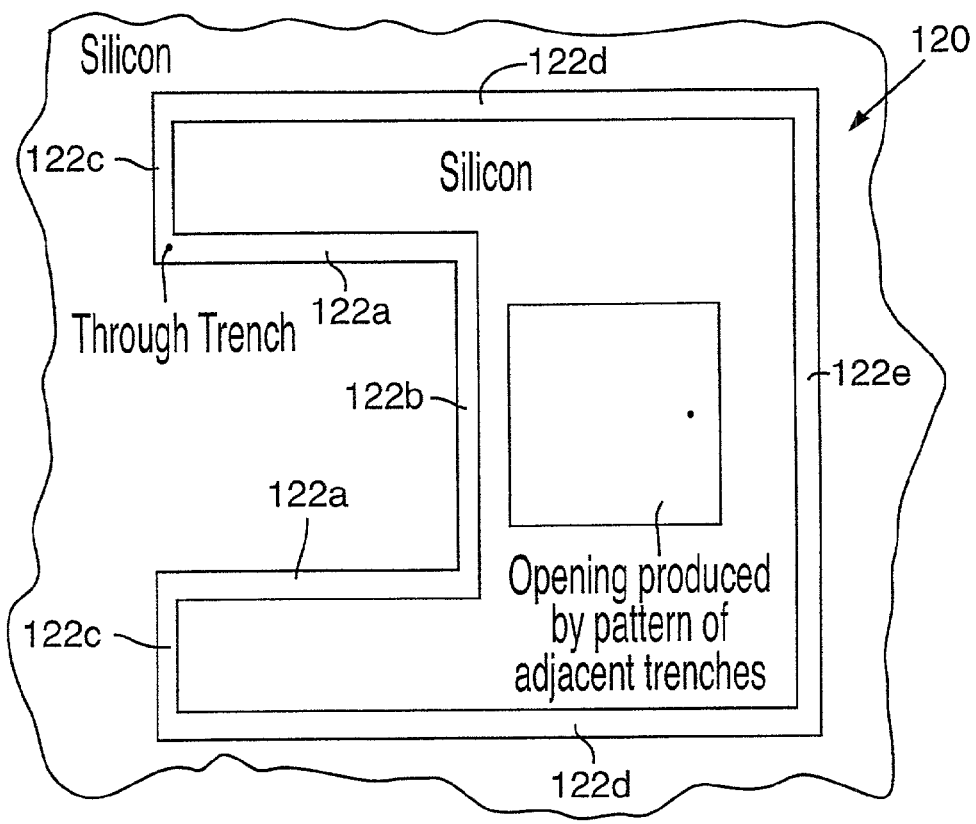
FIG. 11 is a representative illustration of ultraviolet ablative patterning of a MEMS device on a semiconductor wafer.

Another application of the present ultraviolet ablative patterning method is to produce MEMS (microelectronic machine system) devices 120. FIG. 11 is a representative illustration of ultraviolet ablative patterning of a MEMS device 120. In one preferred embodiment, the MEMS device 120 is patterned using the method described above to create trenches 122a, 122b, 122c, 122d, and 122e (generically trenches 122) in silicon. Skilled persons will appreciate that through computer control of the X and/or Y axes of the laser positioning system 30, the directed laser system output pulses 32 can be directed to the work surface such that overlapped pulses create a pattern which expresses any complex curvilinear geometry. This capability combined with the ultraviolet ablative patterning method may be used to produce complex curvilinear geometric patterns in silicon useful for efficient production of a variety of MEMS devices 120.

Figure 12:
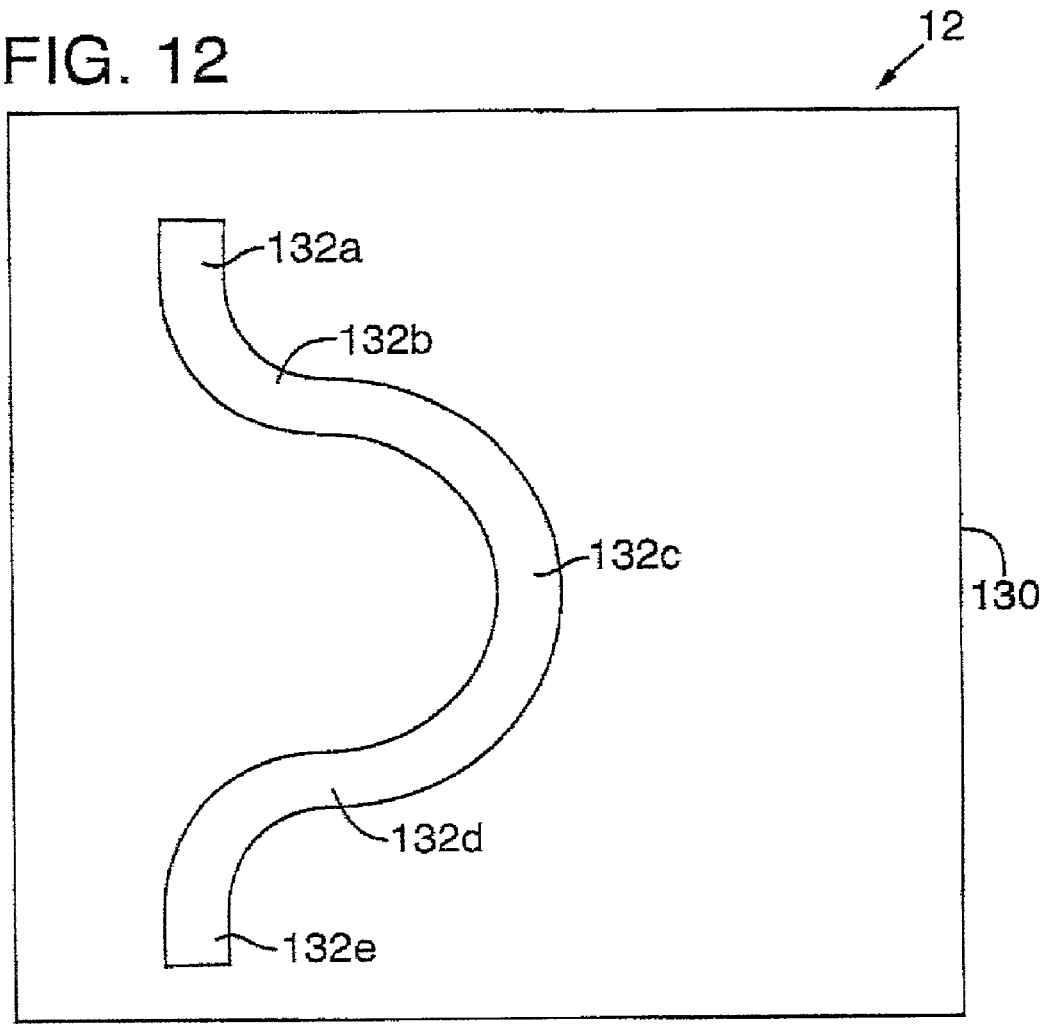
FIG. 12 is a representative illustration of ultraviolet ablative patterning of an AWG device fabricated on a semiconductor wafer.

Another application of the present ultraviolet ablative patterning method is to process optical integrated circuits, such as an arrayed waveguide gratings (AWG) device 130 produced on semiconductor wafer workpieces 12. FIG. 12 is a representative illustration of ultraviolet ablative patterning of an AWG device 130. In one preferred embodiment, the AWG 130 is patterned using the method described above to create curvilinear trenches 132, with portions 132*a*, 132*b*, 132*c*, 132*d*, and 132*e* in silicon, for example. Although trench 132 is shown to be symmetric, skilled persons will appreciate that through computer control of the X and/or Y axes of the laser positioning system 30, the directed laser system output pulses 32 can be directed to the work surface such that overlapped pulses 32 create a pattern which expresses any complex curvilinear profile or geometry. This capability combined with the ultraviolet ablative patterning method may be used to produce complex curvilinear geometric patterns in silicon useful for efficient production of a variety of AWG devices 120.

Employment of conventional metal chucks, such as fabricated from aluminum, is not advantageous for through processing silicon workpieces 12 because the high reflection of these traditional metallic materials in the ultraviolet can cause backside damage to silicon workpieces 12. Experiments have shown significant evidence of backside damage around cylindrical through-hole openings 100 or through trenches 110 from reflective energy coming off the metal chuck top after through processing has been completed. However, no backside damage was discovered in proximity to cylindrical through-hole openings 100 or through trenches 110 that were serendipitously drilled over tooling holes in the chuck top.

Figure 13:
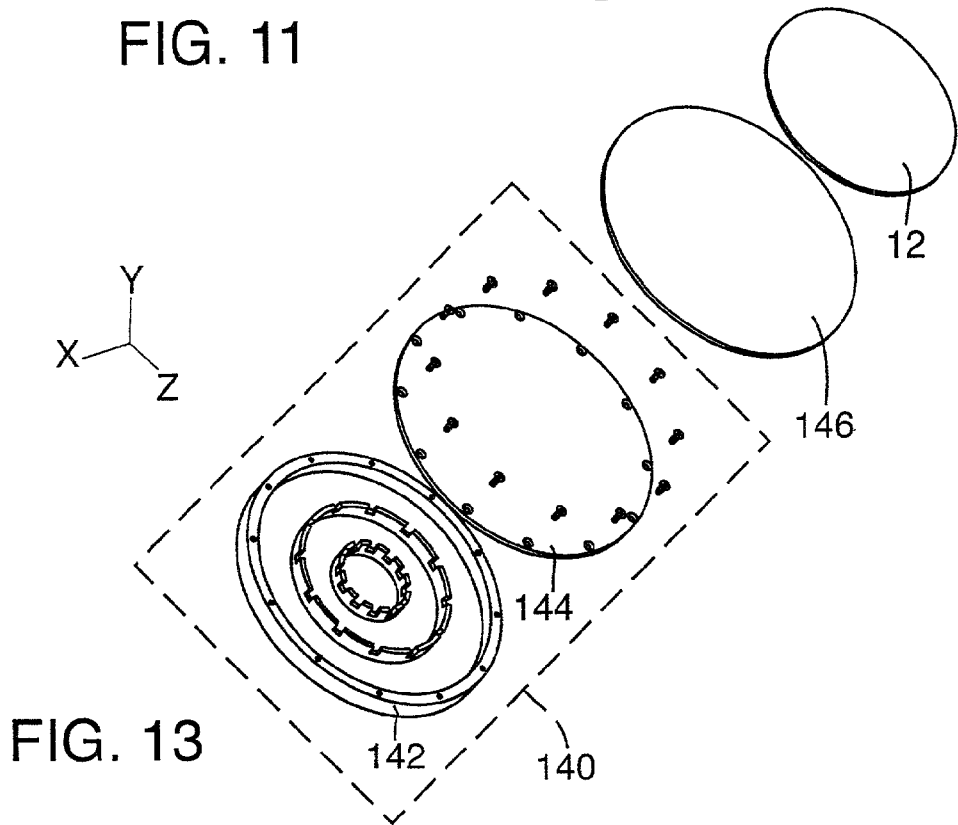
FIG. 13 is a representative illustration of an ultraviolet transparent chuck on which semiconductor workpieces are placed for through processing using the ultraviolet ablative patterning method.

FIG. 13 is a representative illustration of a chuck assembly 140 on which silicon workpieces 12 are preferably placed for through processing using the ultraviolet ablative patterning method. Chuck assembly 140 preferably includes a vacuum chuck base 142, a chuck top 144, and an optional retaining carrier 146. Base 142 is preferably made from traditional metal material and is preferably bolted to an additional plate 148. Plate 148 is adapted to be easily connected to and disengaged from at least one of the stages 36 or 38. The engagement mechanism is preferably mechanical and may include opposing grooves and ridges and may include a locking mechanism. Skilled person will appreciate that numerous exact alignment and lock and key mechanisms are possible. Skilled persons will also appreciate that the base 142 may alternatively be adapted to be secured directly to the stages 36 or 38.

Chuck top 144 is preferably fabricated from a dielectric material, which has low reflectivity at the ultraviolet wavelength selected for the particular patterning application. In one preferred embodiment, where 355 nm output from a frequency-tripled, Q-switched diode-pumped Nd:YAG laser is employed, UV-transparent chuck top 144 is fabricated from ultraviolet-grade or excimer grade fused silica, $MgF_2$, or $CaF_2$. In another embodiment, UV-transparent chuck top 144 may alternatively or additionally be liquid-cooled to assist in maintaining the temperature stability of the silicon workpieces 12. Those skilled in the art will recognize that fused silica is an ultraviolet transparent material composed of amorphous silicon dioxide and is formed by chemical combination of silicon and oxygen.

With reference again to FIG. 13, a retaining carrier 146 may be placed over chuck top 144 for the purpose of supporting a silicon workpiece 12 and retaining it after ultraviolet ablative patterning. Retaining carrier 146 is also preferably fabricated from an ultraviolet transparent material in order to prevent backside reflections from damaging workpieces 12 that are through processed. Retaining carrier 146 is preferably machined to contain shallow cavities into which the processed silicon workpieces 12 settle after through processing operations.

In an alternative embodiment, chuck top 144 or retaining carrier 146 may be fabricated from an ultraviolet absorbing material, such as Al or Cu, in order that laser system 10 may use a tool path file of the pattern of shallow cavities to be drilled into the workpiece 12 to cut the corresponding pattern into the material of chuck top 144 or retaining carrier 146. The cavities may, for example, correspond to intended drill holes or edge patterns and prevent backside damage to the workpiece 12 during through cut operations. In addition, any debris from the process may settle into the cavities away from the backside of workpiece 12. In one preferred embodiment, the pattern of the shallow cavities is processed to have dimensions slightly larger than those of the corresponding workpieces 12 after processing, thereby enabling processed workpieces 12 to settle into the cavities of the retaining carrier 146. In an alternative embodiment, retaining carrier 146 is fabricated from an ultraviolet transparent material by alternative means, such as optical fabrication or etching, and is subsequently aligned and affixed on the chuck top 144. These embodiments of chuck assembly 140 also have useful applications in UV via drilling in other materials such as polyamide.

Those skilled in the art will recognize that purge gases, such as nitrogen, argon, helium, and dry air, may be usefully employed to assist in the removal of waste fumes from the workpiece 12. Such purge gases can be delivered to the close vicinity of the work surface using delivery nozzles attached to laser system 10.

In order to improve the surface quality of the silicon workpieces 12 processed using the ultraviolet ablative patterning method, processed workpieces 12 may be cleaned using ultrasonic baths in liquids including but not limited to water, acetone, methanol, and ethanol. Those skilled in the art will recognize that cleaning of processed silicon workpieces 12 in hydrofluoric acid can be beneficial in removing unwanted oxide layers.

Although the description provided above has been largely directed toward processing silicon and GaAs, the methods described are also generally applicable to other semiconductors that may be used as the substrate 70 for workpieces 12, such as SiC, SiN, or indium phosphide.

It will be obvious to those having skill in the art that many changes may be made to the details of the above-described embodiment of this invention without departing from the underlying principles thereof. The scope of the present invention should, therefore, be determined only by the following claims.

The invention claimed is:

1. A method for laser processing a silicon, gallium arsenide, indium phosphide, or single crystalline sapphire substrate, comprising:
    providing slow and fast movement-controlling signals from a positioning signal processor;
    controlling with a slow positioner driver a large range of relative movement of a translation stage in response to the slow movement-controlling signal;
    controlling with a fast positioner driver a small range of relative movement of a fast positioner in response to the fast movement-controlling signal;
    generating first laser system output having at least a first laser pulse at a wavelength shorter than 400 nm and having an output pulse energy of greater than 100 µJ at a repetition rate of greater than 5 kHz;

directing the first laser system output at a target location on the substrate to ablate substrate material at the target location with a first spot area of less than 25 µm on the surface of the target material;

generating second laser system output having at least a second laser pulse at a wavelength shorter than 400 nm and having an output pulse energy of greater than 100 µJ at a repetition rate of greater than 5 kHz;

directing the second laser output to impinge a second target location with a second spot area of less than 25 µm on the surface of the target material such that the second spot area at least partly overlaps the first spot area.

2. A method for laser processing a silicon, gallium arsenide, indium phosphide, or single crystalline sapphire substrate, comprising:

generating first laser system output at a wavelength shorter than 400 nm and having an output pulse energy of greater than 100 pJ at a repetition rate of greater than 5 kHz;

directing the first laser system output at a target location on the substrate to ablate substrate material at the target location with a first spot area of less than 25 µm on the surface of the target material;

generating second laser system output at a wavelength shorter than 400 nm and having an output pulse energy of greater than 100 µJ at a repetition rate of greater than 5 kHz;

directing the second laser output to impinge a second target location with a second spot area of less than 25 µm on the surface of the target material such that the second spot area at least partly overlaps the first spot area to form a through hole through the substrate, substrate being at least 50 µm thick and the through hole having an aspect ratio of greater than about 20:1.

3. The method of claim 2 in which at least 5 laser system output pulses are generated at a repetition rate of greater than 5 kHz.

4. The method of claim 2 in which the substrate is impinged on its front surface and the through hole penetrates its back surface, the method further comprising:

employing characteristics of the through hole on the back surface for aligning a device to perform a process on the back surface of the substrate.

5. The method of claim 4 in which at least two through holes are formed and both through holes are employed to align the back surface of the substrate for further processing.

6. The method of claim 2 in which the substrate is impinged on its front surface and the through hole penetrates its back surface, and in which the substrate is supported by a chuck having a surface material that is substantially nonreflective to the laser system outputs that travel through the through hole.

7. The method of claim 6 in which the surface material of the chuck substantially inhibits laser damage to the back surface of substrate.

8. The method of claim 6 in which the surface material of the chuck is substantially transparent to the laser system outputs.

9. The method of claim 6 in which the surface material of the chuck is substantially absorbing to the wavelength of the laser system outputs.

10. The method of claim 2 in which the substrate is impinged on its front surface and the through hole penetrates its back surface, and in which the substrate is supported by a chuck having a surface material has openings over which through hole processing occurs.

11. A method for laser processing a silicon, gallium arsenide, indium phosphide, or single crystalline sapphire substrate, comprising:

generating first laser system output at a wavelength shorter than 400 nm and having an output pulse energy of greater than 100 µJ at a repetition rate of greater than 5 kHz;

directing the first laser system output at a target location on the substrate to ablate substrate material at the target location with a first spot area of less than 25 µm on the surface of the target material;

generating second laser system output at a wavelength shorter than 400 nm and having an output pulse energy of greater than 100 µJ at a repetition rate of greater than 5 kHz;

directing the second laser output to impinge a second target location with a second spot area of less than 25 µm on the surface of the target material such that the second spot area at least partly overlaps the first spot area to form a kerf having a lengthwise dimension greater than the spot size.

12. The method of claim 11 in which characteristics of the laser outputs inhibit formation of a melt lip.

13. The method of claim 11 in which characteristics of the laser outputs inhibit slag formation.

14. The method of claim 11 in which characteristics of the laser outputs inhibit peel back of the kerf edge.

15. The method of claim 11 further comprising:

generating successive laser system outputs at a wavelength shorter than 400 nm and having output pulse energies of greater than 100 µJ at a repetition rate of greater than 5 kHz;

directing the successive laser outputs to impinge successive target locations with spot areas of less than 25 µm on the surface of the target material such that the successive spot areas at least partly overlap respective preceding spot areas to form the kerf.

16. The method of claim 11 in which the kerf comprises a curvilinear profile.

17. The method of claim 11 further comprising:

providing slow and fast movement-controlling signals from a positioning signal processor;

controlling with a slow positioner driver a large range of relative movement of a translation stage in response to the slow movement-controlling signal;

controlling with a fast positioner driver a small range of relative movement of a fast positioner in response to the fast movement-controlling signal to effect the curvilinear profile of the kerf.

18. The method of claim 11 in which the substrate has deep kerfs with bottoms, and the deep kerfs separate devices but retain sufficient thickness of substrate at the bottom of the deep kerfs to connect the devices, further comprising employing the laser system outputs to separate the devices.

19. The method of claim 11 in which the substrate has a substrate depth and the kerf extends through the substrate depth, and in which the substrate is supported by a chuck having a surface material that is substantially nonreflective to the laser system outputs that travel through the kerf.

20. The method of claim 19 in which the surface material of the chuck substantially inhibits laser damage to the back surface of substrate.

21. The method of claim 19 in which the surface material of the chuck is substantially transparent to the laser system outputs.

22. The method of claim 19 in which the surface material of the chuck is substantially absorbing to the wavelength of the laser system outputs.

23. The method of claim 11 in which the substrate has a substrate depth and the kerf extends through the substrate depth, and in which the chuck has openings over which through kerf processing occurs.

24. A method for laser processing a silicon, gallium arsenide, indium phosphide, or single crystalline sapphire substrate of a workpiece having first and second surfaces, comprising:
providing slow and fast movement-controlling signals from a positioning signal processor;
controlling with a slow positioner driver a large range of relative movement of a translation stage in response to the slow movement-controlling signal, the translation stage comprising or supporting a chuck having a surface material that is substantially nonreflective to laser system outputs;
controlling with a fast positioner driver a small range of relative movement of a fast positioner in response to the fast movement-controlling signal;
generating successive laser system outputs at a wavelength shorter than 400 nm and having output pulse energies of greater than 100 µJ at a repetition rate of greater than 5 kHz;
directing the successive laser outputs to impinge successive target locations with spot areas of less than 25 µm on a first surface of the workpiece such that the successive spot areas at least partly overlap respective preceding spot areas to form a through hole or through cut in the substrate without substantially damaging the second surface.

25. The method of claim 24 in which the surface material of the chuck is substantially transparent to the laser system outputs that travel through the through cut or through hole.

26. The method of claim 24 in which the surface material of the chuck is substantially absorbing to the wavelength of the laser system outputs that travel through the through cut or through hole.

27. The method of claim 1 in which characteristics of the laser outputs inhibit formation of a melt lip.

28. The method of claim 1 in which characteristics of the laser outputs inhibit slag formation.

29. The method of claim 1 further comprising:
generating successive laser system outputs at a wavelength shorter than 400 nm and having output pulse energies of greater than 100 µJ at a repetition rate of greater than 5 kHz;
directing the successive laser outputs to impinge successive target locations with spot areas of less than 25 µm on the surface of the target material such that the successive spot areas at least partly overlap respective preceding spot areas to form the kerf.

30. The method of claim 29 in which the kerf comprises a curvilinear profile.

31. The method of claim 29 in which characteristics of the laser outputs inhibit peel back of the kerf edge.

32. The method of claim 1 in which the first and second laser system output are generated by the same laser, which is a solid-state laser.

33. The method of claim 2 in which the first and second laser system outputs are generated by the same laser.

34. The method of claim 11 in which the first and second laser system outputs are generated by the same laser.

35. The method of claim 24 in which the successive laser system outputs are generated by the same laser.

36. The method of claim 1 in which the first and second laser system outputs are generated by at least two lasers.

37. The method of claim 2 in which the first and second laser system outputs are generated by at least two lasers.

38. The method of claim 11 in which the first and second laser system outputs are generated by at least two lasers.

39. The method of claim 24 in which the successive laser system outputs are generated by at least two lasers.

40. The method of claim 1 in which the first and second laser system outputs provide a bite size of 0.1 to 10 µm.

41. The method of claim 11 in which the first and second laser system outputs provide a bite size of 0.1 to 10 µm.

42. The method of claim 24 in which the successive laser system outputs provide a bite size of 0.1 to 10 µm.

43. The method of claim 1 in which the first and second laser system outputs have output pulse energies of less than 1500 µJ.

44. The method of claim 2 in which the first and second laser system outputs have output pulse energies of less than 1500 µJ.

45. The method of claim 11 in which the first and second laser system outputs have output pulse energies of less than 1500 µJ.

46. The method of claim 24 in which the successive laser system outputs have output pulse energies of less than 1500 µJ.

47. The method of claim 1 in which the first and second laser system outputs have output pulse energies of greater than 200 µJ.

48. The method of claim 2 in which the first and second laser system outputs have output pulse energies of greater than 200 µJ.

49. The method of claim 11 in which the first and second laser system outputs have output pulse energies of greater than 200 µJ.

50. The method of claim 24 in which the successive laser system outputs have output pulse energies of greater than 200 µJ.

51. The method of claim 6 in which the chuck comprises $MgF_2$ or $CaF_2$.

52. The method of claim 19 in which the chuck comprises $MgF_2$ or $CaF_2$.

53. The method of claim 24 in which the chuck comprises $MgF_2$ or $CaF_2$.

54. The method of claim 2 in which the substrate has a depth of greater than 300 µm.

55. The method of claim 24 in which the substrate has a depth of greater than 300 µm.

56. The method of claim 2 in which the substrate has a depth of greater than 500 µm.

57. The method of claim 24 in which the substrate has a depth of greater than 500 µm.

* * * * *

UNITED STATES PATENT AND TRADEMARK OFFICE
CERTIFICATE OF CORRECTION

PATENT NO. : 7,157,038 B2 Page 1 of 1
APPLICATION NO. : 10/017497
DATED : January 2, 2007
INVENTOR(S) : Brian W. Baird et al.

It is certified that error appears in the above-identified patent and that said Letters Patent is hereby corrected as shown below:

<u>Column 5</u>
Line 11, change "positioning system 40" to --positioning system 30--.

<u>Column 7</u>
Line 49, change "laser system 48" to --laser system 10b--.

<u>Column 11</u>
Line 22, change "workpieces 10" to --workpieces 12--.

<u>Column 13</u>
Line 19, change "AWG devices 120" to --AWG devices 130--.

<u>Column 15</u>
Line 21, change "pico joule" to --µ joule--.

Signed and Sealed this

Twenty-eighth Day of August, 2007

JON W. DUDAS
*Director of the United States Patent and Trademark Office*